United States Patent
Cantrill (10) Patent No.: US 7,350,196 B1
(45) Date of Patent: Mar. 25, 2008

(54) MECHANISM FOR LOSSLESS FUNCTION ENTRY AND RETURN TRACING

(75) Inventor: Bryan M. Cantrill, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 732 days.

(21) Appl. No.: 10/713,633

(22) Filed: Nov. 14, 2003

(51) Int. Cl.
*G06F 9/44* (2006.01)

(52) U.S. Cl. ...................... 717/128; 712/227

(58) Field of Classification Search .............. None
See application file for complete search history.

(56) References Cited

U.S. PATENT DOCUMENTS 7,065,633 B1 * 6/2006 Yates et al. ................. 712/227

OTHER PUBLICATIONS

Richard Moore, et al. IBM Dynamic Probes http://www-124ibm.com/developerworks/opensource/linux/projects/dprobes/README, 2000.

* cited by examiner

*Primary Examiner*—Wei Zhen
*Assistant Examiner*—Phillip H Nguyen
(74) *Attorney, Agent, or Firm*—Osha Liang LLP (57) ABSTRACT

A method for tracing an instrumented program, including triggering an trap instruction in the instrumented program, transferring control of the instrumented program to a trap handler associated with the trap instruction, and emulating an instruction corresponding to the trap instruction in the trap handler, wherein the instruction relates to creating or dismantling a stack frame.

13 Claims, 6 Drawing Sheets

MECHANISM FOR LOSSLESS FUNCTION ENTRY AND RETURN TRACING

CROSS REFERENCE TO RELATED APPLICATIONS

This application is related to an application entitled "Mechanism For Lossless Tracing In An Arbitrary Context" and application entitled "Mechanism For Lossless Tracing In An Architecture Having A Delay Slot", both filed simultaneously herewith, the disclosure of which is hereby incorporated by reference in its entirety.

BACKGROUND

Analyzing the dynamic behavior and performance of a complex software system is difficult. Typically, analysis of a software system is achieved by gathering data at each system call and post-processing the data. Data is gathered at each system by placing a probe at locations of interest in the software (i.e., instrumenting the software to obtain an instrumented program) and gathering data when the probe is encountered by the thread executing the instrumented program.

Probes are typically represented in the instrumented code as trap instructions. The location (i.e., address) of each trap instruction is stored in a look-up table and associated with an original instruction (i.e., the instruction that was replaced when the program was instrumented to generate an instrumented program). The trap instruction is also typically associated with one or more actions that a tracing framework is to perform when the trap instruction is encountered by a thread executing the instrumented program.

When a thread executing the instrumented program encounters a trap instruction, control is transferred to a trap handler, which calls into the tracing framework and performs the action(s) associated with the trap instruction. The trap handler then looks up the original instruction in the look-up table. The trap instruction is then overwritten by the original instruction (i.e., the original instruction is placed in the same address space as the trap instruction in the code path). The tracing framework then single-steps the original instruction. The results of single-stepping the original instruction are then used to update the state of the instrumented program (i.e., the values of the registers, program counter(s), etc.) The original instruction in the code path is then overwritten by the trap instruction that was originally encountered by the thread. The thread then resumes executing the instrumented program.

Alternatively, the original instructions may be replaced with a reserved trap instruction, and when a thread executing the instrumented program encounters the reserved trap, all threads executing in the instrumented program are suspended while the thread that caused the trap single-steps the original instruction, which is temporarily written over the trap instruction, as defined above. After the thread has single-stepped the original instruction, the reserved trap that was encountered by the thread is copied back over the original instruction in the code path. All threads executing in the instrumented program then resume executing the instrumented program.

In a system in which more than one thread is executing within a given instrumented program, a particular thread may not trigger a probe (i.e., encounter a trap instruction) if the thread encounters the original instruction corresponding to a probe as opposed to the trap instruction. This situation typically occurs when a first thread encounters the trap instruction and overwrites it with a corresponding original instruction, and while this is occurring a second thread encounters the original instruction. In this scenario, the first thread calls into the tracing framework to perform the action(s) associated with the trap instruction, while the second thread executes the original instruction but does not call into the tracing framework.

SUMMARY

In general, in one aspect, the invention relates to a method for tracing an instrumented program, comprising triggering an trap instruction in the instrumented program, transferring control of the instrumented program to a trap handler associated with the trap instruction, and emulating an instruction corresponding to the trap instruction in the trap handler, wherein the instruction relates to creating or dismantling a stack frame.

In general, in one aspect, the invention relates to a system for tracing an instrumented program, comprising the instrumented program comprising at least one trap instruction associated with an instruction, wherein the instruction relates to creating or dismantling a stack frame, a thread configured to execute the instrumented program, and a trap handler configured to halt execution of the thread when the trap instruction is encountered and to emulate the instruction associated with the trap instruction.

Other aspects of embodiments of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

The invention relates to method and apparatus for tracing an instrumented program. More specifically, the invention relates to a method and apparatus for lossless tracing of entry and return functions on stack-based architectures. An example of a stack-based architecture is the IA-32 Intel® Architecture. Intel® is a registered trademark of the Intel Corporation.

Instrumented programs establish a stack frame upon entry into the function and dismantle the stack frame upon completing execution of the function and prior to continuing execution with the instrumented program. If these functions are instrumented and subsequently emulated in the kernel, for example in a trap handler, then when an instrumented function is encountered by a thread executing the instrumented program, the instrumented function may be emulated within the kernel without requiring the instruction, corresponding to the function, to be single-stepped.

Figure 1:
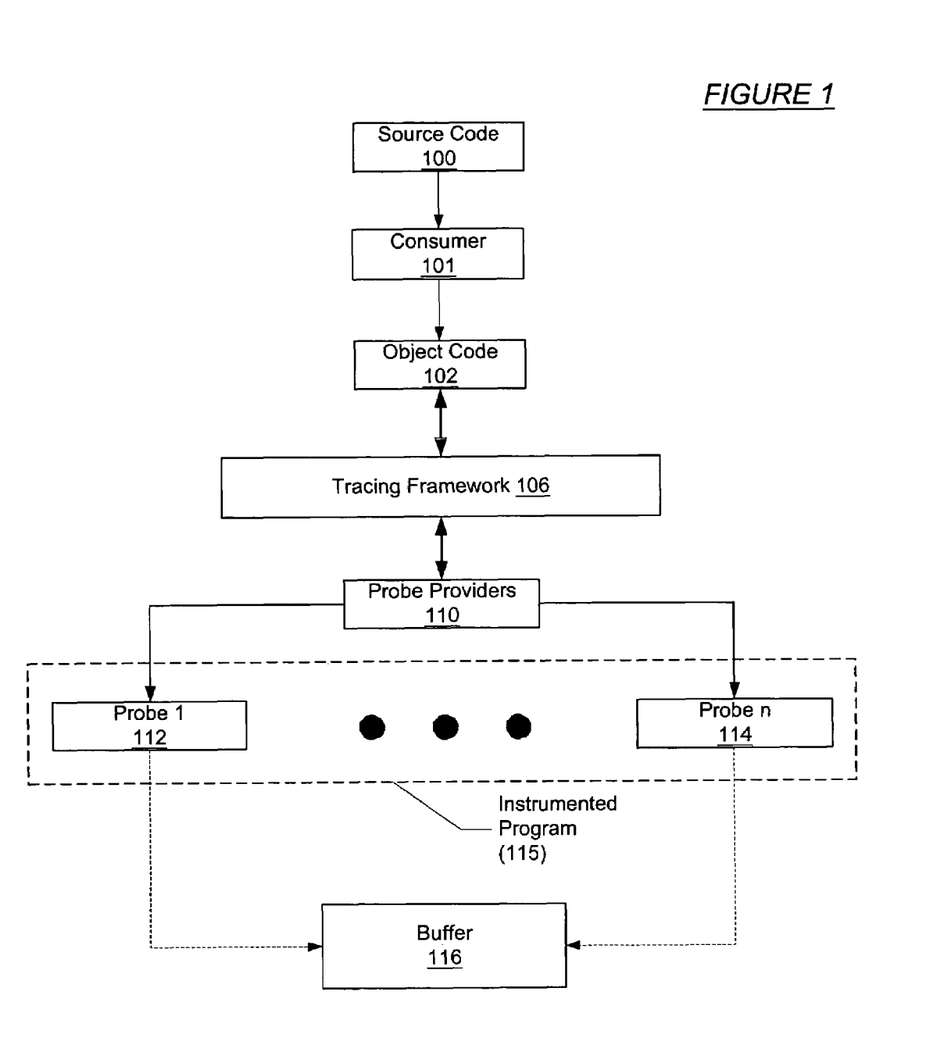
FIG. 1 shows a tracing framework architecture in accordance with an embodiment of the invention.

FIG. 1 shows a flow diagram detailing collection of data in accordance with one embodiment of the invention. Specifically, FIG. 1 provides an overview of the process for collecting data for the buffer (116). Initially, source code (100) is written/obtained/generated that defines a tracing function (i.e., a request to obtain certain data). More specifically, the tracing function defines which probes (112, 114) to enable within the instrumented program (115), and what actions that the tracing framework (106) is to perform when the probes (112, 114) are triggered (i.e., when a thread executing the instrumented program (115) encounters the probe (112, 114)). In one or more embodiments of the invention, a tracing function may define one or more actions that the tracing framework (106) is to perform when a probe (112, 114) is encountered.

The source code (100) is typically associated with a consumer (101). Note that a consumer (101) may define one or more tracing functions. The consumer is a virtual client that sends requests, in the form of tracing functions, to the tracing framework (106) to obtain information about the instrumented program (115). Further, the consumer (101) also retrieves the requested information, which is stored by the tracing framework (106) in the associated buffers (116).

The source code (100) is subsequently forwarded, via the consumer (101) to a compiler (not shown), where the source code (100) is compiled to generate executable object code (102). The object code (102) is then communicated to a tracing framework (106). The tracing framework (106) includes functionality to execute the object code (102). Specifically, the tracing framework (106) interprets the object code (102) and directs the probe providers (110) to activate certain probes (112, 114) within the instrumented program (115).

The probes (112, 114) gather the specified information from the instrumented program (115), as defined by the object code (102) derived from the actions defined within the source code (100), and forward the information (directly or indirectly) to a corresponding buffer (116).

In one or more embodiments of the invention, each probe (112, 114) in the instrumented program (115) is represented by a trap instruction. The address corresponding to location of the trap instruction within the instrumented program (115) is recorded in a look-up table along with the original instruction (i.e., the particular instruction that the consumer would like to execute to obtain data). In one embodiment of the invention, the original instruction corresponds to an action that is to be performed when the probe (112, 114) is encountered. The action, as noted above, is typically defined by the consumer (101). In one embodiment of the invention, representing each probe as a trap instruction and generating a corresponding look-up table may be performed by the tracing framework.

Within the aforementioned framework shown in FIG. 1, in one or more embodiments of the invention, the instructions establishing and dismantling stack frames upon entry and return of the function, respectively, may be identified within the instrumented program and replaced with a reserved interrupt (e.g., INT 3) or modified to form an illegal opcode (e.g., adding the #LOCK prefix to the instruction). Thus, when a reserved interrupt is encountered, control is transferred to a trap handler. When an illegal opcode is encountered, control is transferred to an illegal opcode trap handler as defined by the interrupt descriptor table (IDT).

In one embodiment of the invention, the following code sample ("Code Sample 1") corresponds to an instruction sequence for establishing a stack frame.

| CODE SAMPLE 1 | | |
|---|---|---|
| pushl | % ebp | / save base pointer |
| movl | % esp, % ebp | / move stack pointer into base pointer |

In one embodiment of the invention, establishing a stack frame may be instrumented by replacing the "pushl" instruction with an INT 3 instruction. The following code sample ("Code Sample 2") corresponds to an instruction sequence for dismantling a stack frame, in accordance with one embodiment of the invention.

| CODE SAMPLE 2 | | |
|---|---|---|
| movl | % ebp, % esp | / restore stack pointer from base pointer |
| popl | % ebp | / restore base pointer |
| ret | | / return from function |

In one embodiment of the invention, dismantling a stack frame may be instrumented by replacing the "popl" instruction with an INT 3 instruction. The "pushl" and "popl" instructions may then be emulated in the kernel, for example in a trap handler.

Similarly, the "enter" instruction, which is synonymous with establishing a stack frame instruction sequence (i.e., CODE SAMPLE 1), may be instrumented by replacing the "enter" instruction with an INT 3 instruction. Further, the "leave" instruction, which is synonymous with dismantling a stack frame instruction sequence (i.e., CODE SAMPLE 2), may be instrumented by replacing the "leave" instruction with an INT 3 instruction.

Figure 2:
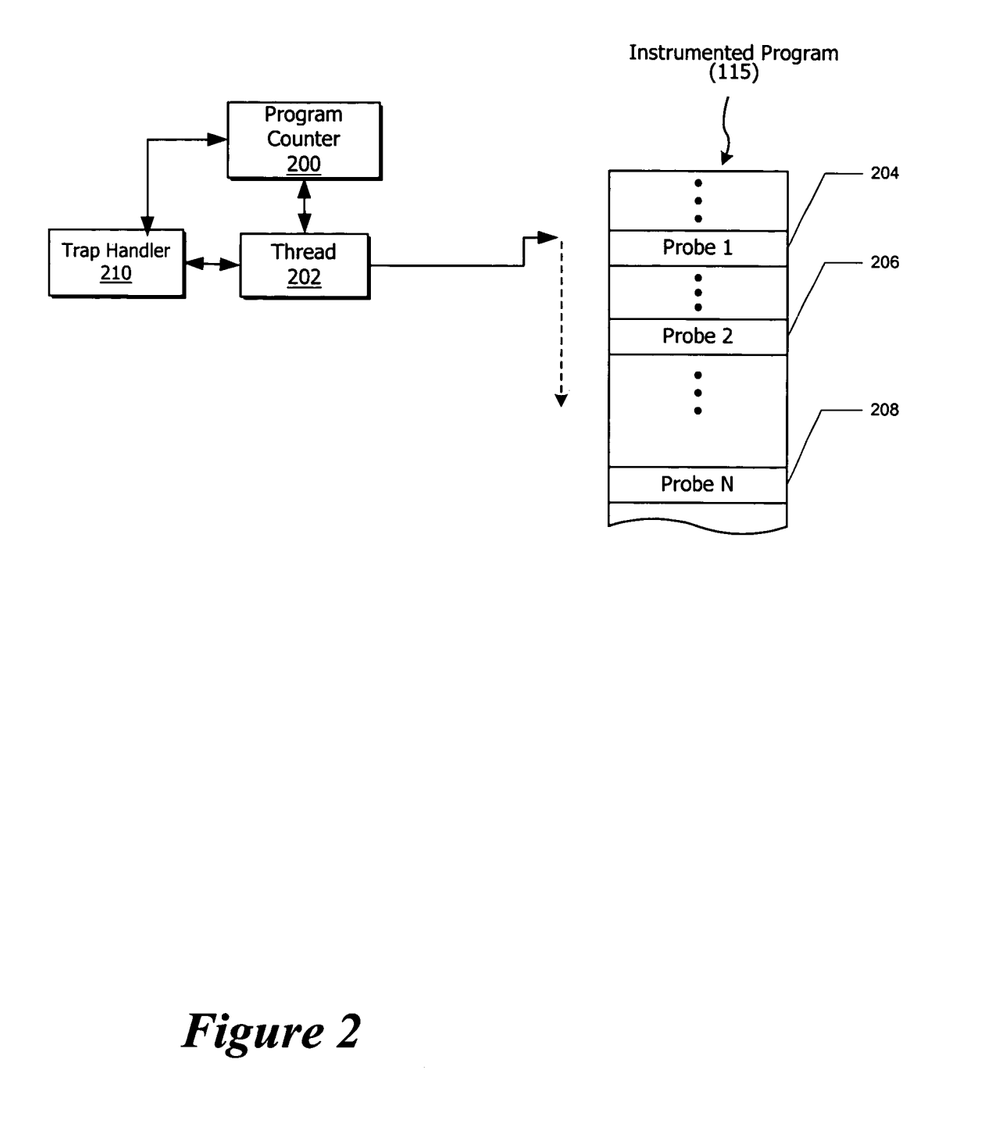
FIG. 2 shows a flow diagram in accordance with one embodiment of the invention.

FIG. 2 shows a flow diagram in accordance with one embodiment of the invention. A program counter (200) stores a value corresponding to a current address in the instrumented program (115) in which a thread (202) is executing. When a probe (204, 206, 208), represented by a trap instruction, is encountered by the thread (302), the thread (200) transfers control to a trap handler (210). More specifically, when a probe (204, 206, 208) is encountered, a trap instruction is triggered which is subsequently handled by the trap handler (210).

The specific trap handler (210) that processes the trap instruction is determined by an interrupt descriptor table (not shown). In one or more embodiments of the invention, the trap handler (210) includes functionality to emulate the aforementioned instructions (i.e., popl, pushl, enter, and leave). Prior to emulating the aforementioned instruction, the trap handler (210) calls into the tracing framework (106) to perform tracing operations associated with the trap instruction. After the tracing framework (106) has completed execution of the tracing operations, the trap handler (210) emulates the instruction and then returns from the trap (i.e., transfers control back to the thread (202)).

Figure 3:
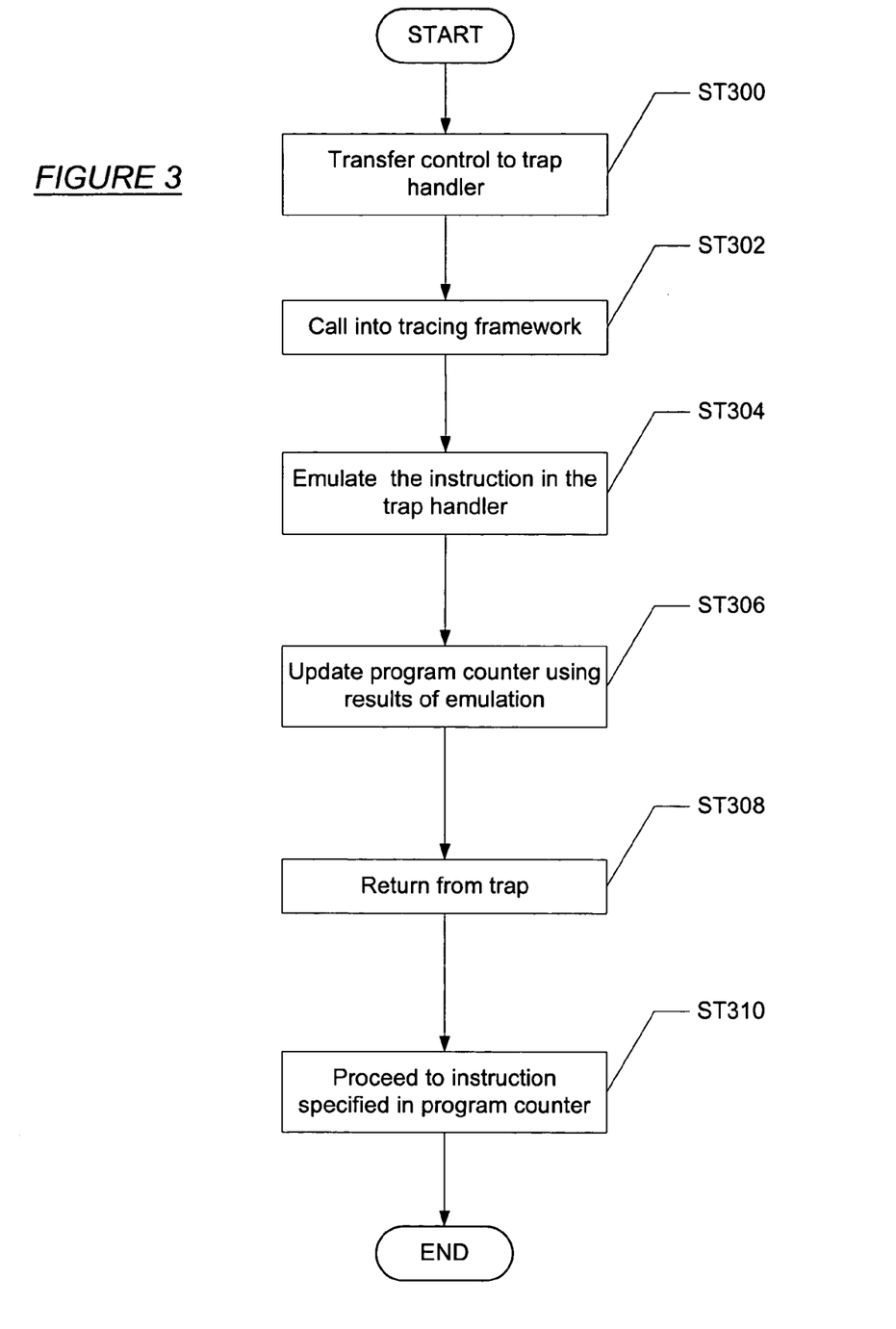
FIG. 3 shows a flowchart in accordance with one embodiment of the invention.

FIG. 3 shows a flowchart in accordance with one embodiment of the invention. More specifically, FIG. 3 shows a flowchart detailing the steps that occur when a probe (e.g., a trap instruction corresponding to a probe) is encountered by a thread executing the instrumented program. When a thread executing the instruction is encountered, the thread transfers control to an appropriate trap handler (Step 300). The trap handler calls into the tracing framework to perform tracing operations as required (Step 302). In one or more embodiments of the invention, the tracing framework performs a tracing operation and generates corresponding tracing information. The tracing information may include, but is not limited to, an argument, a pointer value, a name of a system call, etc.

Continuing with the discussion of FIG. 3, after the trap handler has made the appropriate calls into the tracing framework, the trap handler emulates the instruction (Step 304). The trap handler uses the results of the emulation to update the program counter (Step 306). The trap handler then transfers control back to the thread (i.e., return for trap) (Step 308). The thread then proceeds to execute the instruction specified in the program counter (Step 310).

Figure 4A:
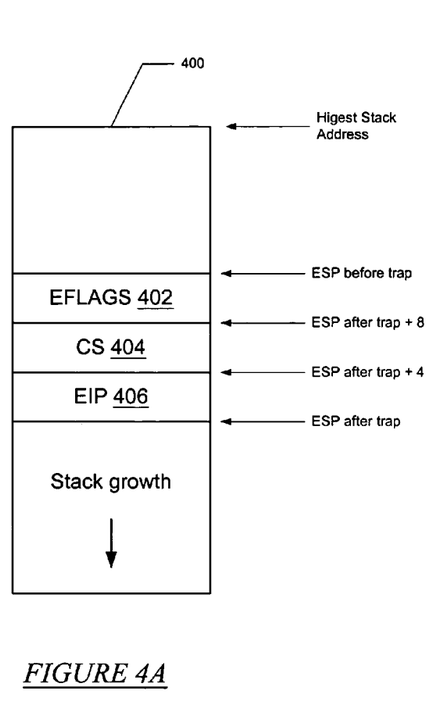
FIG. 4A shows a stack frame in accordance with one embodiment of the invention.

The following discussion describes various embodiments for emulating the aforementioned instructions in accordance with one embodiment of the invention. FIG. 4A shows a stack frame in accordance with one embodiment of the invention. More specifically, FIG. 4A shows the composition of a stack frame (400) when a trap instruction corresponding to a "pop1" instruction is first triggered. When a trap instruction is encountered by a thread, three elements are loaded on the stack frame (400): 1) EFLAGS (402); 2) CS (404); and 3) EIP (406). EFLAGS (402) corresponds to a current EFLAGS register (i.e., a register including a group of status flags, a control flag, and a group of system flags). CS (404) corresponds to a code segment address, which denotes where the instructions that are currently being executed are stored. EIP (406) corresponds to the current instruction pointer or, more specifically, the offset within the code segment of the next instruction to be executed. Continuing with the description of FIG. 4A, a stack pointer (ESP) is used as a point of reference for elements within the stack frame (400).

Note that the caption "ESP before trap" indicates the position of the ESP prior to execution of the trap instruction, and "ESP after trap" indicates the position of the ESP after the aforementioned elements have been entered into the stack frame stack (400) prior to emulation. Similarly, "EBP before trap" (not shown in FIG. 4A) indicates the position of the EBP, defined below, prior to execution of the trap instruction. In addition, the aforementioned captions may include offsets (e.g., "ESP after trap+8"). The offset corresponds to a location within the stack frame defined with respect to the position (e.g., "ESP after trap") defined in the caption.

Figure 4B:
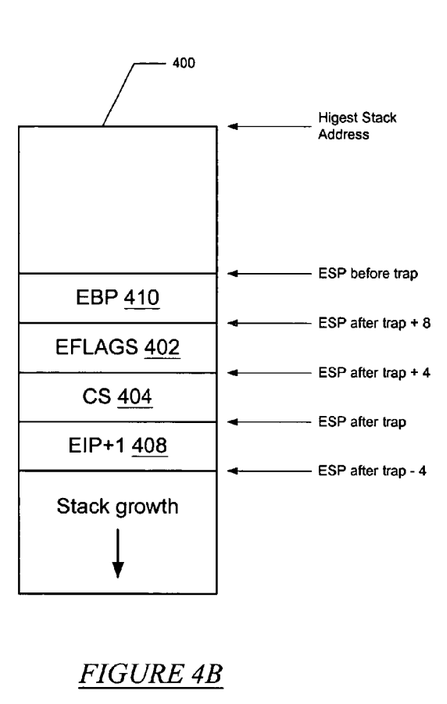
FIG. 4B shows a stack frame in accordance with one embodiment of the invention.

In one embodiment of the invention, the "push1" instruction is emulated in an INT 3 trap handler in the following manner. Note that the stack frame resulting from the following emulation, but prior to returning from the trap, is shown in FIG. 4B, described below. Continuing the discussion of the emulation, the value at "ESP after trap" (i.e., EIP (406)) is initially incremented by one instruction to obtain EIP+1 (408). EIP+1 (408) is subsequently stored at "ESP after trap−4." The value at "ESP after trap+4" (i.e., CS (404)) is then stored at "ESP after trap." The value at "ESP after trap+8" (i.e., EFLAGS (402)) is then stored at "ESP after trap+4." The stack frame base pointer (EBP) (410), which identifies a fixed reference point within the stack frame for the called procedure at the time of the trap instruction was executed, is stored at "ESP after trap+8."

As noted above, FIG. 4B shows a stack frame in accordance with one embodiment of the invention. More specifically, FIG. 4B shows the state of the stack frame (400) after the aforementioned operations have been performed on the stack frame as described above. Continuing with the discussion of emulating the "push1" instruction, once the aforementioned elements have been loaded, the ESP is decremented by 4 (i.e., the size of one element in the stack frame) and a return from interrupt (IRET) instruction is issued.

More specifically, the IRET instruction returns program control from the trap handler to the interrupted instrumented program. Upon returning from a trap instruction, the IRET instruction pops the return-instruction pointer from the stack back into the EIP register and restores the EFLAGS register from the stack. Execution of the instrumented program then resumes. After the IRET instruction has been issued, the architecture state is no different than it would have been had the "push1 % ebp" been natively executed.

Figure 5A:
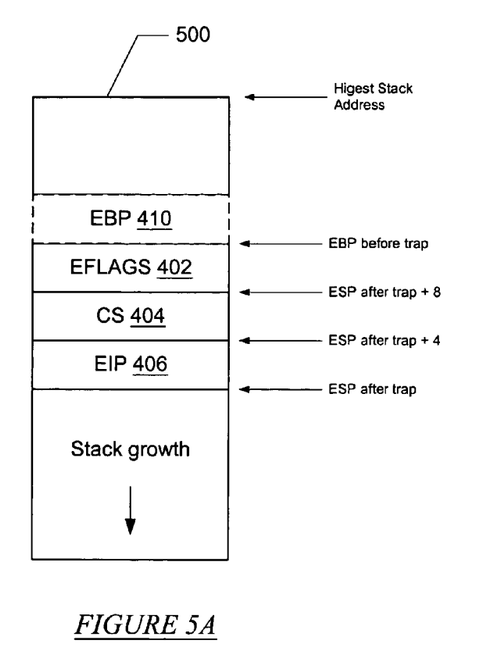
FIG. 5A shows a stack frame in accordance with one embodiment of the invention.

FIG. 5A shows a stack frame in accordance with one embodiment of the invention. More specifically, FIG. 5A shows the composition of a stack frame (500) when a trap instruction corresponding to a "pop1" instruction is first triggered. When a trap instruction is encountered by a thread, four elements are loaded on/present in the stack frame (500): 1) EFLAGS (402); 2) CS (404); 3) EIP (406); and 4) EBP (410). EBP (410) corresponds to the stack frame base pointer.

Figure 5B:
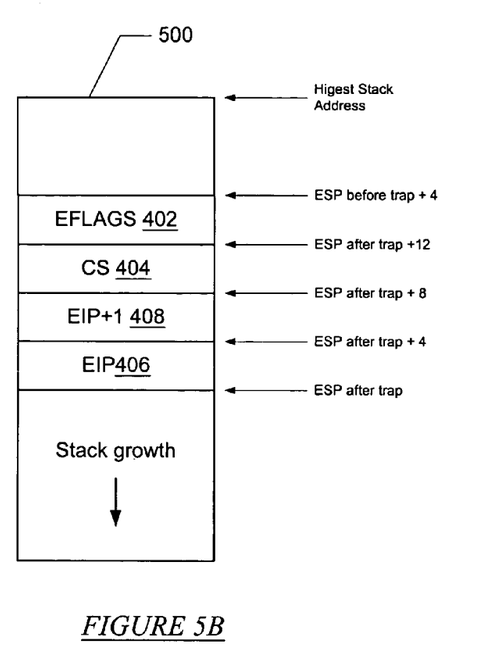
FIG. 5B shows a stack frame in accordance with one embodiment of the invention.

In one embodiment of the invention, the "pop1" instruction is emulated in an INT 3 trap handler in the following manner. Note that the stack frame resulting from the following emulation, but prior to returning from the trap, is shown in FIG. 5B, described below. Continuing the discussion of the emulation, initially, the EBP (410) at "EBP before trap" is loaded into an associated EBP register. In one embodiment of the invention, "EBP before trap" points to the same location as "ESP after trap+12." The value at "ESP after trap+8" (i.e., EFLAGS (402)) is then stored at "ESP after +12." The value at "ESP+4" (i.e., CS (404)) is subsequently stored at "ESP after trap+8." The value at ESP after trap (i.e., EIP (406)) is then incremented by one instruction to obtain EIP+1 (408) and subsequently stored at "ESP after trap+4."

As noted above, FIG. 5B shows a stack frame in accordance with one embodiment of the invention. More specifically, FIG. 5B shows the state of the stack frame (500) after the aforementioned operations have been performed on the stack frame as described above. Continuing with the discussion of emulating the "pop1" instruction, once the aforementioned elements have been loaded, the "ESP after trap" is incremented by 4 (i.e., the size of one element in the stack frame) and a return from interrupt (IRET) instruction is issued. After the IRET instruction has been issued, the architecture state is no different than it would have been had the "pop1 % ebp" been natively executed.

In one embodiment of the invention, the "enter" instruction may be emulated in an INT 3 trap handler in the following manner. As noted above, the "enter" instruction is synonymous with "push1 % ebp; mov1 % esp, % ebp." Thus, the "enter" instruction may be emulated by following the same procedure as defined above with respect to emulating the "pushl" instruction with the additional step of loading the value of the ESP+4 into the EBP register prior to decrementing "ESP after trap."

In one embodiment of the invention, the "leave" instruction may be emulated in the following manner. As noted above, the "leave" instruction is synonymous with "movl % ebp, % esp; popl % ebp; ret." Thus, the "leave" instruction may be emulated using the same procedure as defined above with respect to emulating the "popl" instruction with the following modifications.

First, the location of "ESP after trap" must be determined with respect to the "EBP before trap." After the location of "ESP after trap" is determined with respect to the "EBP before trap," the "leave" instruction may be emulated using the same general procedure as the emulation of "popl," outlined above but instead of being moved up the stack by four bytes, EFLAGS (402), CS (404), and EIP (406) are moved up to the "EBP before trap" location in the stack frame.

Figure 6A:
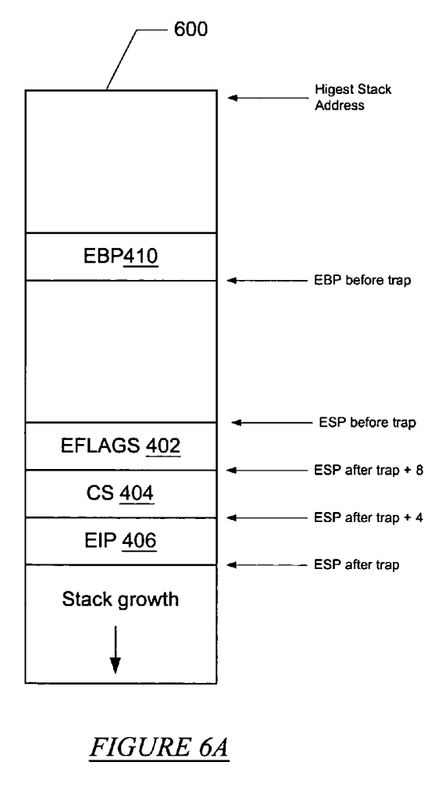
FIG. 6A shows a stack frame in accordance with one embodiment of the invention.
Figure 6B:
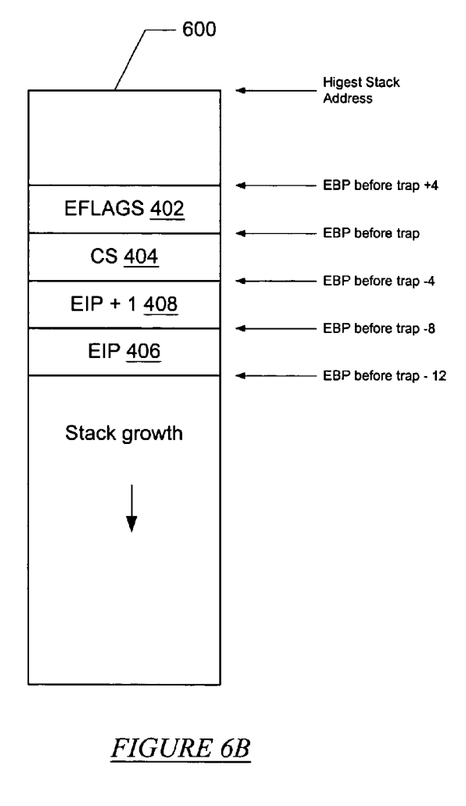
FIG. 6B shows a stack frame in accordance with one embodiment of the invention.

FIG. 6A shows a stack frame in accordance with one embodiment of the invention. More specifically, FIG. 6A shows the state of the stack frame (600) after entry into the trap handler but prior to emulation of the "leave" instruction. Specifically, the stack frame (600) includes EFLAGS (402) at "ESP after trap+8," CS (404) at "ESP after trap+4," EIP (402) at "ESP after trap," and EBP (410) at "EBP before trap." FIG. 6B shows a stack frame in accordance with one embodiment of the invention. More specifically, FIG. 6B shows the state of the stack frame (600) after emulating the "leave" instruction, as defined above, but prior to returning from the trap. Specifically, the stack frame (600) includes EFLAGS (402) at "ESP before trap," CS (404) at "ESP before trap−4," EIP (408) at "EBP before trap−8," and EIP (402) at "ESP before trap−12."

The invention provides an efficient means for collecting information about an instrumented program. Specifically, the invention provides a means to collect tracing information in a multi-thread environment without losing tracing information. Further, the invention provides a means to instrument and trace function entry and return on stack-based architectures.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to trace an instrumented program, comprising:

triggering a trap instruction in the instrumented program during tracing of the instrumented program;

transferring control of the instrumented program to a trap handler associated with the trap instruction;

calling into a tracing framework, by the trap handler, to perform a tracing operation associated with the trap instruction;

performing the tracing operation to obtain tracing information, wherein the tracing information is used to analyze the instrumented program; and emulating, after performing the tracing operation, an original instruction in the instrumented program using the trap handler, wherein the original instruction is associated with the trap instruction, wherein the original instruction relates to creating or dismantling a stack frame, wherein emulating the original instruction comprises emulating a pushl instruction, and wherein emulating the pushl instruction comprises:

obtaining a stack pointer location, wherein the stack pointer location corresponds to a location in the stack frame;

incrementing an instruction pointer to obtain an incremented instruction pointer;

loading the incremented instruction pointer in the stack frame at one location before the stack pointer location;

loading a code segment (CS) value stored one location after the stack pointer location into the stack pointer location;

loading an EFLAGS value stored two locations after the stack pointer location into one location after the stack pointer; and loading a base pointer into two locations after the stack pointer location.

2. The method of claim 1, further comprising:

replacing the original instruction with the trap instruction in the instrumented program.

3. The method of claim 1, further comprising:

decrementing the stack pointer location by one location; and issuing a return from interrupt instruction.

4. The method of claim 1, wherein the instruction pointer is loaded at the stack pointer location.

5. The method of claim 1, wherein emulating the original instruction further comprises emulating a leave instruction.

6. The method of claim 5, wherein emulating a leave instruction comprises:

obtaining a stack pointer location, wherein the stack pointer location corresponds to a first location in the stack frame;

obtaining a base pointer location, wherein the base pointer location corresponds to a second location in the stack frame;

loading a base pointer obtained at the base pointer location into a base pointer register;

loading an EFLAGS value stored two locations after the stack pointer location into the base pointer location;

loading a code segment (CS) value stored one location after the stack pointer location into one location before the base pointer location;

incrementing an instruction pointer to obtain an incremented instruction pointer;

loading the incremented instruction pointer in the stack frame at two locations before the base pointer location; and loading the instruction pointer at three locations before the base pointer.

7. The method of claim 6, further comprising:

setting the stack pointer location to three locations before the base pointer location;

incrementing the stack pointer location by one location; and issuing a return from interrupt instruction.

8. A method to trace an instrumented program, comprising:

triggering a trap instruction in the instrumented program during tracing of the instrumented program;

transferring control of the instrumented program to a trap handler associated with the trap instruction;

calling into a tracing framework, by the trap handler, to perform a tracing operation associated with the trap instruction;

performing the tracing operation to obtain tracing information, wherein the tracing information is used to analyze the instrumented program; and emulating, after performing the tracing operation, an original instruction in the instrumented program using the trap handler, wherein the original instruction is associated with the trap instruction, wherein the original instruction relates to creating or dismantling a stack frame, and wherein emulating the original instruction comprises emulating an enter instruction wherein emulating the enter instruction comprises:
  obtaining a stack pointer location, wherein the stack pointer location is corresponds to a location in the stack frame;
  incrementing an instruction pointer to obtain an incremented instruction pointer;
  loading the incremented instruction pointer in the stack frame at one location before the stack pointer location;
  loading a code segment (CS) value stored one location after the stack pointer location into the stack pointer location;
  loading an EFLAGS value stored two locations after the stack pointer location into one location after the stack pointer;
  loading a base pointer into two locations after the stack pointer location; and
  loading the base pointer into a base pointer register.

9. The method of claim 8, further comprising:
decrementing the stack pointer location by one location; and
issuing a return from interrupt instruction.

10. The method of claim 8, wherein the instruction pointer is loaded at the stack pointer location.

11. A method to trace an instrumented program, comprising:
triggering a trap instruction in the instrumented program during tracing of the instrumented program;
transferring control of the instrumented program to a trap handler associated with the trap instruction;
calling into a tracing framework, by the trap handler, to perform a tracing operation associated with the trap instruction;
performing the tracing operation to obtain tracing information, wherein the tracing information is used to analyze the instrumented program; and
emulating, after performing the tracing operation, an original instruction in the instrumented program using the trap handler,
wherein the original instruction is associated with the trap instruction,
wherein the original instruction relates to creating or dismantling a stack frame,
wherein emulating the original instruction comprises emulating a pop1 instruction,
wherein emulating the pop1 instruction comprises:
  obtaining a stack pointer location, wherein the stack pointer location corresponds to a location in the stack frame;
  loading a base pointer obtained from three locations after the stack pointer location into a base pointer register;
  loading an EFLAGS value stored two locations after the stack pointer location into three locations after the stack pointer location;
  loading a code segment (CS) value stored one location after the stack pointer location into two locations after the stack pointer location;
  incrementing an instruction pointer to obtain an incremented instruction pointer; and
  loading the incremented instruction pointer in the stack frame at one location before the stack pointer location.

12. The method of claim 11, further comprising:
incrementing the stack pointer location by one location; and
issuing a return from interrupt instruction.

13. The method of claim 11, wherein the instruction pointer is loaded at the stack pointer location.

* * * * *